Sept. 7, 1926.

W. E. GRACE, JR 1,598,680

CONNECTING LINK

Filed Feb. 21, 1925

WILLIAM E. GRACE JR.
Inventor

By Chas. Silver
Attorney

Patented Sept. 7, 1926.

1,598,680

UNITED STATES PATENT OFFICE.

WILLIAM E. GRACE, JR., OF BALTIMORE, MARYLAND.

CONNECTING LINK.

Application filed February 21, 1925. Serial No. 10,899.

This invention relates to connecting links or couplers for chains and has specific application to a metallic link serving as a connection or splice between ends of chains employed in the coupling of railway engines, cars and other objects of great weight moved upon railways.

Among the objects of this invention is to provide a link serving as a connection between ends of chains used as couplers for railway cars, engines, etc., the connecting link being capable of application to the ends of the chains in a simple, convenient, efficient and safe manner. A further object of this invention is to provide a connecting link of this character having central portions that will receive chain links of a given size both edgewise and crosswise and end portions that will receive such chain links in an edgewise direction only and to further provide means for preserving the size of the central portions by preventing or greatly counteracting the pinching effect upon the enlarged portions at the center caused by the application of high tensions or loads at the ends of the connecting link.

Other, further and more specific objects of the invention will become readily apparent to persons skilled in the art from a consideration of the following description when taken in conjunction with the drawings, wherein.

Figure 1:
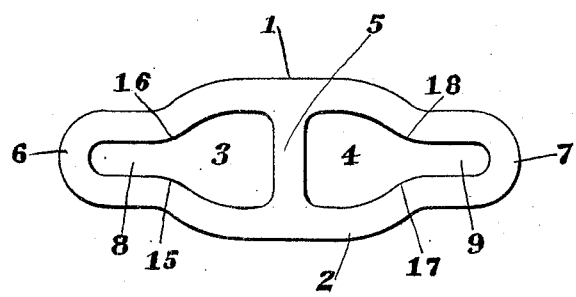
Fig. 1 is a plan view of my connecting link.
Figure 2:
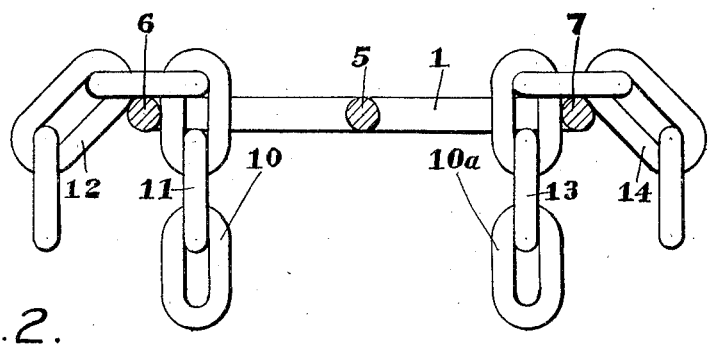
Fig. 2 is a side view showing my connecting link with chains at each end thereof, portions of the connecting link being broken away to better illustrate its structural details.

This connecting link comprises a loop, preferably of metal and circular cross-section having an enlarged central portion formed by the sides (1) and (2) and divided into two sections (3) and (4) by the cross-member (5) which is preferably made of the same material as the loop and also preferably integral therewith. The side members (1) and (2) are continuous with the constricted ends (6) and (7) of the loop which form slots (8) and (9) that are continuous with the sections (3) and (4) separated by the crossbar (5).

In using this device the chain (10) is inserted through the sections (3) or (4) and then passed edgewise into the narrower slotted parts (8) or (9). These slots (8) and (9) are of such size as to receive chain links of a given size when inserted edgewise only, the sections (3) and (4) being larger than the corresponding slots (8) and (9) and adapted to receive (both edgewise and crosswise) chain links of the size which will enter the slots (8) and (9) only in an edgewise direction. When chains of such size are inserted in slots (8) or (9), the chain links immediately adjacent the chain link within the slot will prevent its withdrawal therefrom other than by return edgewise movement into sections (3) or (4). However, when a pull is applied to the chain in a direction away from the connecting link, the effect is to draw the inserted link toward the extreme end of the slot (8) or (9) and against the ends (6) or (7) of the loop. This locks the chain against removal of the inserted chain link from the slot (8) or (9) during the application of the pulling force at the end of the loop.

In using my device for coupling cars or other objects to be moved by engines, the chain (10) is securely fixed at one end to one of the objects to be connected and the other end is passed through section (3) and then one of the links of the chain is passed edgewise into the slot (8). Another chain (10ª) is also fixed to the other movable object to be coupled and the loose end of the chain inserted into section (4) and then passed edgewise into slot (9). If there is any slack in the connection, the chains may be made taut by drawing either one or both of the chains around the ends (6) and (7) until the connection is taut, and in order to prevent disengagement of the chains with the connector when the coupled objects are brought together, a wire may be passed around two or more of the links adjacent to the coupler, for example links (11) and (12) and links (13) and (14).

My connecting link is intended primarily for coupling trains of cars or other objects and it will be seen that this coupler must be sufficiently robust and able to withstand tremendous stresses to which it is subjected under such conditions of use. In prior devices of this character, upon application of very heavy loads at ends of the coupler there was a pinching effect produced, largely in the central enlarged portion and to a slightly lesser extent in the slotted portions of the loop. This resulted in the drawing together of the loop at the portions (15), (16), (17) and (18), thus locking the chain links within the slotted portions (8) and (9) and rendering it difficult or practically impossible to withdraw such chains from the link without the aid of special devices for reopening these constricted portions of the coupler. The ultimate effect was to make it practically impossible to remove this coupler until the cars were brought to the shops where appliances were employed for either cutting the links from the chains or else enlarging the pinched sections of the link.

In order to overcome or counteract this pinching effect I have provided my device with the compression member or crossbar (5). This crossbar resists the tendency to draw the loop together at the points (15), (16), (17) and (18) upon application of heavy tensile stresses or loads at the ends (6) and (7). In fact, the tendency is to open rather than constrict the loop at (15), (16), (17) and (18) when my connector is provided with the compression member (5). The provision of this compression member constitutes a very important feature of my invention.

My new connecting link is not only highly efficient and readily applicable for coupling cars and making other quick and safe connection between engines and their tenders and other objects to be moved where there is no regular coupler or drawhead, but this new device also dispenses with the use of hazardous connecting elements such as bolts, pins, etc., commonly employed for fastening the chains to each other, for when the load is applied to the chains fastened by bolts, pins, etc., these frequently become detached and are projected in various directions resulting in injuries to persons and other objects.

The present invention is not limited to the specific details set forth in the foregoing examples which should be construed as illustrative and not by way of limitation, and in view of the numerous modifications which may be effected therein without departing from the spirit and scope of this invention, it is desired that only such limitations be imposed as are indicated in the appended claims.

I claim as my invention:

1. A connecting link for chains comprising a loop having a central enlarged portion and constricted portions from said enlarged portion to each end of said loop, said constricted portions forming slots adapted to receive a chain link edgewise only and said enlarged portion being adapted to receive said chain link crosswise and edgewise, and means comprising a compression member disposed across the central enlarged portion for preventing contraction of said central enlarged portion upon application of high load at the ends of said constricted portions.

2. A connecting link for chains comprising a loop having a central enlarged portion divided into two sections by a crossbar extending from the sides of said enlarged portion, each of said sections being continuous with slots formed by the ends of said loop, said slots being adapted to receive a chain link edgewise only and said sections being adapted to receive said chain link crosswise and edgewise, said crossbar serving as a compression member for preventing pinching of said enlarged portion upon application of high load at the ends of said loop.

3. A connecting link for chains comprising a metalic element of substantially circular cross-section and formed into a loop having a central enlarged portion divided into two sections by an integral, metallic crossbar extending from the sides of said enlarged portion, each of said sections being continuous with slots formed by the ends of said loop, said slots being adapted to receive a chain link edgewise only and said section being adapted to receive said chain link crosswise and edgewise, said crossbar serving as a compression member for preventing pinching of said enlarged portion and slots upon application of high load at the ends of said loop.

In testimony whereof I affix my signature.

WILLIAM E. GRACE, Jr.